(12) United States Patent
Wou et al.

(10) Patent No.: US 10,414,388 B2
(45) Date of Patent: Sep. 17, 2019

(54) SYSTEMS FOR DISTRIBUTING BRAKING FORCE AND RELATED METHODS

(71) Applicant: FORD GLOBAL TECHNOLOGIES, LLC, Dearborn, MI (US)

(72) Inventors: Jason Soungjin Wou, Novi, MI (US); Timothy Gerard Offerle, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 712 days.

(21) Appl. No.: 15/077,014

(22) Filed: Mar. 22, 2016

(65) Prior Publication Data

US 2017/0274877 A1   Sep. 28, 2017

(51) Int. Cl.
*B60T 8/18* (2006.01)
*B60T 8/24* (2006.01)
*B60T 8/171* (2006.01)

(52) U.S. Cl.
CPC .............. *B60T 8/246* (2013.01); *B60T 8/171* (2013.01)

(58) Field of Classification Search
CPC ........ B60T 7/12; B60T 13/168; B60T 13/686; B60T 13/746; B60T 2201/06; B60T 2270/82; B60T 2270/83; B60T 8/00; B60T 8/171; B60T 8/246; B60T 8/26; B60T 8/3255; B60T 8/90; B62D 6/00; B62D 6/06; Y10S 188/01
See application file for complete search history.

(56) References Cited

U.S. PATENT DOCUMENTS

| | | | |
|---|---|---|---|
| 4,223,953 A * | 9/1980 | Cruse | B60T 13/161 303/13 |
| 5,125,724 A | 6/1992 | Steiner | |
| 6,422,663 B1 * | 7/2002 | Siepker | B60T 7/12 188/DIG. 1 |
| 7,182,412 B2 | 2/2007 | Ogawa | |
| 8,768,592 B2 | 7/2014 | Kornhaas et al. | |
| 8,798,888 B2 | 8/2014 | Braegas | |
| 2015/0094925 A1* | 4/2015 | Senoo | B60T 1/005 701/70 |

FOREIGN PATENT DOCUMENTS

DE    102004003886 A1    11/2005

* cited by examiner

*Primary Examiner* — Charles J Han
(74) *Attorney, Agent, or Firm* — Jones Robb, PLLC; Raymond Coppiellie

(57) ABSTRACT

A system includes a controller configured to individually control brake force applied to steered wheels of a vehicle. The controller is configured to release a braking force from a first brake associated with a first steered wheel of the vehicle when the vehicle is stationary, and the controller is further configured to subsequently release a braking force from a second brake of a second steered wheel when the vehicle remains stationary after braking force is released from the first wheel. Methods relate to distributing braking force of a vehicle.

24 Claims, 3 Drawing Sheets

SYSTEMS FOR DISTRIBUTING BRAKING FORCE AND RELATED METHODS

TECHNICAL FIELD

The present disclosure relates generally to methods for distributing braking force and related systems. In particular, methods of the disclosure relate to distributing braking force to reduce a load on a steering system of a vehicle.

BACKGROUND

Vehicles may include steering systems that pivot steered wheels of the vehicle about generally vertical steering axes. Such steering systems may be operable by, e.g., rotating a steering wheel, which may be connected by a steering gear and mechanical linkage to the steered wheels. Some steering systems may include assistance systems, such as hydraulic or electrical power steering systems. These systems may reduce the force (e.g., torque) an operator must apply to a steering control, such as a steering wheel, to rotate the steered wheels of the vehicle about the steering axes. Such systems may include hydraulic and/or electrical components configured to apply a torque or force to the steering system of the vehicle to augment the operator's input and thereby reduce the steering effort.

Steering effort may be highest when the vehicle is stationary with the brakes depressed. Under these conditions, movement of the steered wheels about the steering axes may cause the portion of the steered wheels in contact (e.g., a tire contact patch) with a surface (e.g., road) on which the vehicle rests to "scrub" against the surface. In other words, a static frictional force between the vehicle tires and the road surface must be overcome to steer the wheels. This frictional force may be significant, particularly in heavy vehicles, vehicles with the engine and/or drivetrain positioned above the steered wheels, vehicles with large tire contact patches, etc. Components of steering assistance systems must be capable of producing enough force to overcome this frictional force. Furthermore, in the case of vehicles where no steering assistance is provided to the operator (i.e., manually steered vehicles), the force required to steer the wheels may be greater than the operator can comfortably provide, and/or the steering ratio (i.e., the mechanical advantage provided the operator by the steering mechanism) may be undesirably high.

It is desirable to provide systems capable of reducing the required steering force when the vehicle is at rest, to allow utilization of steering components of lesser power, weight, and cost, and/or to reduce the steering effort required to steer the wheels.

SUMMARY

In accordance with various exemplary embodiments, a system includes a controller configured to individually control brake force applied to steered wheels of a vehicle. The controller is configured to release a braking force from a first brake associated with a first steered wheel of the vehicle when the vehicle is stationary, and the controller is further configured to subsequently release a braking force from a second brake of a second steered wheel when the vehicle remains stationary after braking force is released from the first wheel.

In accordance with exemplary embodiments, a method of distributing braking force of a vehicle includes with a controller of the vehicle, disengaging a first brake of a first steered wheel of the vehicle when data from a vehicle speed sensor indicates the vehicle is stationary, and subsequently disengaging a second brake of a second steered wheel of the vehicle if data from the vehicle speed sensor continues to indicate the vehicle is stationary after disengaging the first brake.

In accordance with exemplary embodiments, a method of distributing braking force of a vehicle includes determining, at a controller, whether the vehicle is stationary based on data collected by a vehicle speed sensor, determining, at the controller, whether a steering wheel angle is above a predetermined threshold based on data collected by a steering wheel angle sensor, determining, at the controller, whether brakes of the vehicle are engaged based on data collected from a brake engagement sensor, and determining, at the controller, whether an assist force of a power steering assist system is above a predetermined threshold. The method further includes releasing a first brake associated with a first steered wheel of the vehicle when the vehicle is stationary, the steering wheel angle is above the predetermined threshold, the brakes of the vehicle are engaged, and the assist force is above the predetermined threshold, determining, at the controller, if the vehicle remains stationary after releasing the first brake, and upon determination that the vehicle remains stationary, releasing a second brake associated with a second steered wheel of the vehicle.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
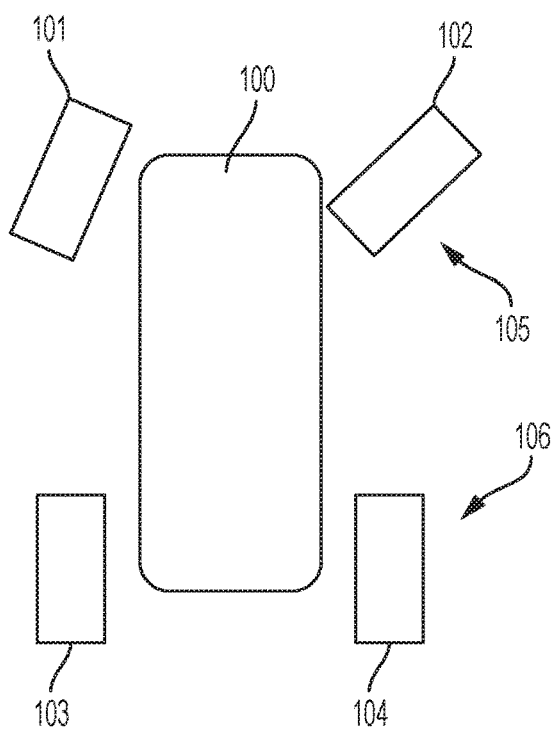
FIG. 1 is a schematic representation of a vehicle in accordance with an exemplary embodiment of the disclosed subject matter.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. The features explained individually in the description can be mutually combined in any technically expedient manner and disclose additional embodiments of the present disclosure.

The disclosure provides systems and methods that may reduce a steering force required to rotate steered wheels of a vehicle about respective steering axes when the vehicle is stationary. Methods of the disclosure may include distributing braking force between steered and non-steered wheels of the vehicle. For example, when the vehicle is stationary, a braking force at non-steered wheels may be increased and braking force at steered wheels may be partially or completely reduced. In some embodiments, the braking force at the steered wheels may be removed individually from each steered wheel. Various sensors of the vehicle may provide data to a controller of the vehicle, and the controller of the vehicle may determine whether to initiate redistribution of braking force based on data from the sensors.

Removing braking force individually from one or both steered wheels may enable a reduction of the required steering force while still providing sufficient braking torque to keep the vehicle stationary. For example, in embodiments of the disclosure, a braking force may be removed first from a steered wheel with a greater contribution to a steering force of the vehicle, and braking force may then be removed from a steered wheel of the vehicle associated with a lesser contribution to the steering force of the vehicle if the vehicle remains stationary after the braking force is removed from the first steered wheel. Exemplary embodiments of the disclosure may have specific benefits for vehicles equipped with automated (e.g., autonomous) steering systems, such as parking assist systems. Systems and methods of the disclosure may reduce loading on steering assist systems, thus enabling an improved (e.g., reduced) turning radius. Such improvements in turning radius may facilitate execution of parking maneuvers and other automated steering functions.

Referring now to FIG. 1, a schematic diagram of a vehicle 100 according to the disclosure is shown. Vehicle 100 may include a plurality of wheels 101, 102, 103, 104 associated with one or more axles of vehicle. For example, in the exemplary embodiment of FIG. 1, two wheels 101, 102 may be associated with a front axle 105 of the vehicle 100, while two wheels 103, 104 may be associated with a rear axle 106 of the vehicle 100. As used herein, the term "axle" may mean and include a longitudinal position of one or more wheels 101, 102, 103, 104 associated with the vehicle 100, regardless of the particular mechanical connection between the one or more wheels. In other words, an "axle" of the vehicle may encompass two wheels at equivalent longitudinal positions at opposite sides of the vehicle, regardless of whether the two wheels are connected to the vehicle frame and/or body independently (e.g., independently suspended) or suspended together on a live axle, beam axle, etc. Furthermore, while FIG. 1 shows a four-wheeled vehicle 100 with a single front axle 105 and a single rear axle 106, the disclosure is equally applicable to vehicles having more than two axles, such as a vehicle having multiple front or rear axles, e.g., a truck with a single front axle and two or more rear axles, or vehicles having an odd number of wheels, such as a vehicle with two wheels at a front axle and a single wheel at a rear axle, etc.

In the exemplary embodiment of FIG. 1, the wheels 101, 102, 103, 104 associated with the front axle 105 may be steered (i.e., rotated about a steering axis generally normal to a surface on which the vehicle 100 rests) by a steering system of the vehicle 100, which may include a steering control, such as a steering wheel (not shown) operable by an operator of the vehicle 100. The steering system may or may not include a power assist system configured to reduce a steering effort required of an operator to steer the vehicle 100. Such a steering system may include, for example and without limitation, a rack-and-pinion, a recirculating ball steering box, a worm and sector gear, etc., with respective linkages such as tie rods, spindle arms, pitman and idler arms, drag links, etc., as required by the particular steering configuration. Some embodiments may encompass a so-called "drive-by-wire" or "steer-by-wire" system in which there is no direct mechanical connection between a steering control (e.g., steering wheel) and the steered wheels 101, 102 of the vehicle 100. In the exemplary embodiment of FIG. 1, the steered wheels 101, 102 are represented as the front wheels; however, in some exemplary embodiments, the steered wheels 101, 102 may be the rear wheels. For example, in some farm vehicles, heavy equipment, etc., the rear wheels may be steered rather than the front wheels. Additionally, some applications may include all-wheel steering, e.g., 4-wheel steering. Conventional automotive 4-wheel steering systems may be configured such that the wheels associated with the front axle are steered with a conventional steering system, while wheels associated with the rear axle may be steered to a lesser degree than the front wheels, e.g., to facilitate maneuvering of the vehicle. Embodiments of the disclosure may be applicable to any such systems, and the systems and routines described herein may be applied to the front wheels, rear wheels, or both front and rear wheels of such systems.

Friction between tires associated with the wheels 101, 102 and a surface on which the vehicle 100 is operated may generate a reaction force that resists efforts to steer the wheels 101, 102. As described above, the steering force may be greatest when the vehicle 100 is stationary and the brakes are engaged, as the contact patch of the tire (i.e., the portion of the tire in contact with a road surface) scrubs on the road surface. Due to the kinematic design of the steering linkage, the steering force may increase as the steering wheel is turned away from on on-center (e.g., straight ahead) position. For example, a mechanical advantage of the steering linkage may be reduced as the wheels are steered away from the on-center position, and the mechanical advantage may reach a minimum when the steering angle reaches the maximum steering angle (e.g., "lock") permitted by the configuration of the steering linkage.

Figure 2:
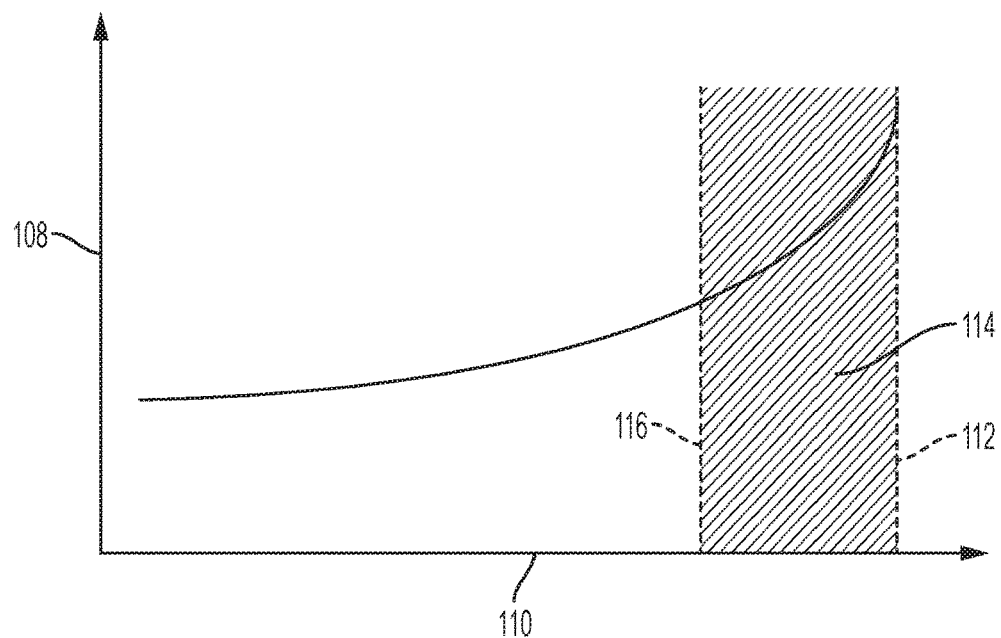
FIG. 2 is a graph depicting steering rack load as a function of steering angle.

For example, with reference now to FIG. 2, a magnitude of a load 108 on the steering linkage (e.g., rack, tie rods, etc.) is shown as a function of steering angle 110. The steering load 108 may increase as steering angle 110 is increased, and may increase at a greater rate as the steering angle 110 increases. In other words, the load 108 on the steering linkage may increase non-linearly with increases in steering angle 110. As shown in FIG. 2, the load on the steering linkage may increase dramatically as the steering angle 110 approaches lock position 112. The brake force redistribution methods described herein may be configured to initiate only when the steering angle enters a range of angles within a predetermined percentage of lock position 112 (e.g., full lock or 100% lock). Such a predetermined range may be represented by the shaded region 114, which may have a lower bound 116 at a predetermined percentage of the lock position 114. In an exemplary embodiment, the lower bound 116 may be chosen to fall within a range of between about 25% and about 75% of full steering lock (e.g., lock position 112); however, the lower bound 116 may be chosen to fall anywhere between 0% lock (i.e., steering straight ahead) and 100% lock. For example, the lower bound 116 of the predetermined range may be chosen to be equal to about 25% of steering lock angle, about 50% of steering lock angle, about 75% of steering lock angle, etc. Stated another way, in exemplary embodiments, the brake force redistribution routine may initiate only when the steering angle is equal to or greater than about 25% of a maximum steering angle, equal to or greater than about 50% of the maximum steering angle, equal to or greater than about 75% of the maximum steering angle, etc. The particular steering angle at which the brake force redistribution routine is initiated may be chosen based on factors such as the geometry of the steering system, a tire contact patch size and shape, and other factors that affect the force necessary to steer the wheels when the vehicle is stationary. By way of non-limiting example, if the steering wheel can be turned 2 full rotations lock to lock, 75% of steering lock angle may be achieved by turning the steering wheel ¾ of a turn to the left, or to the right, from center. While the lower bound 116 is depicted as being about 75% of steering lock angle in FIG. 2, FIG. 2 is only exemplary in nature and should not be construed to limit the range of possible values for the lower bound 116.

Additionally, the steering system of the vehicle 100 may be configured to turn the wheel on the "inside" of a turn (i.e., the wheel closer to a center of a turning radius of the vehicle) more sharply than the wheel on the "outside" of the turn, as the inside wheel is required to traverse an arc with a smaller radius than that traversed by the outer wheel. For example, as shown in FIG. 1, the steering system is positioned to initiate a right turn, and the inner (right wheel in FIG. 1) wheel 102 is turned more sharply than the outer (left wheel in FIG. 1) wheel 101. Accordingly, when the vehicle 100 is stationary and the brakes are engaged, the required force to steer the wheels 101, 102 may be highest, e.g., for a left steered wheel when the steering linkage is positioned at lock to the left of center (i.e., positioned at lock to initiate a left turn), and highest for a right steered wheel when the steering linkage is positioned at lock to the right of center (i.e., positioned at lock to initiate a right turn). For clarity, the terms "steering angle" and "steering wheel angle" as used herein refer to an overall position of the steering linkage, without reference to the specific angles of the individual steered wheels. The specific angles of the individual steered wheels may be referred to as, for example, a degree or amount of rotation of a steered wheel about a respective steering axis.

Referring again to FIG. 1, the wheels 103, 104 associated with the rear axle 106 of the vehicle 100 may be unsteered (i.e., not rotated about a steering axis). In other embodiments, the wheels associated with the rear axle 106 may be steered while the wheels associated with the front axle 104 may be unsteered. For example, some vehicles, such as agricultural vehicles, may include rear-steered wheels. In yet other embodiments, the wheels on the front axle 104 and rear axle 106 may both be steered in unison, or in opposite directions, e.g., in connection with a 4-wheel steering system configured to provide small (e.g., less than 10 degrees, less than 5 degrees, etc.) steering inputs to the rear wheels.

The vehicle 100 may include various sensors configured to provide information regarding operator inputs and other operational parameters of the vehicle 100 to one or more electronic controllers. For example, the vehicle 100 may include a steering angle sensor that provides data related to a steering angle (e.g., lock angle) of the steering system, a wheel speed sensor that provides data relating to a speed of the vehicle, a brake application sensor that provides data related to a command to apply the brakes, such as a depressed or undepressed state of a brake pedal of the vehicle, and a power assist force sensor that provides data related to a level of power assist provided by the power assisted steering system. For example, a power assist force sensor may provide data related to current flow through an electronic power assisted steering (EPAS) motor. In embodiments including a hydraulic steering assist system, the sensor may provide data related to a hydraulic pressure of the steering assist system. Additionally or alternatively, the vehicle 100 may include a steering load sensor configured to provide data related to a load placed on the steering system, such as a strain gauge positioned on a component of the steering linkage. The data from the various sensors may be provided to a controller of the vehicle, such as an electronic control unit (ECU) of the vehicle 100. In some embodiments, the controller may be associated with an electronic brake force distribution (EBD) system. Alternatively or additionally, the ECU may also be associated with one or more of an anti-lock braking system (ABS) of the vehicle 100, an electronic stability control (ESC) system of the vehicle 100, a traction control system of the vehicle 100, etc. Furthermore, the controller may include functionality related to an automatic parking system, trailer backup assist, hill-start assist, etc.

The controller may comprise a synchronous data link control (SLDC) controller that manages data communication on a vehicle network. For example, the vehicle network may implement controller area network (CAN) protocol, a local interconnect network (LIN) protocol, or may be any other suitable vehicle network. Data may be communicated between various vehicle network devices in the form of messages (e.g., CAN messages) over the vehicle bus.

Figure 3:
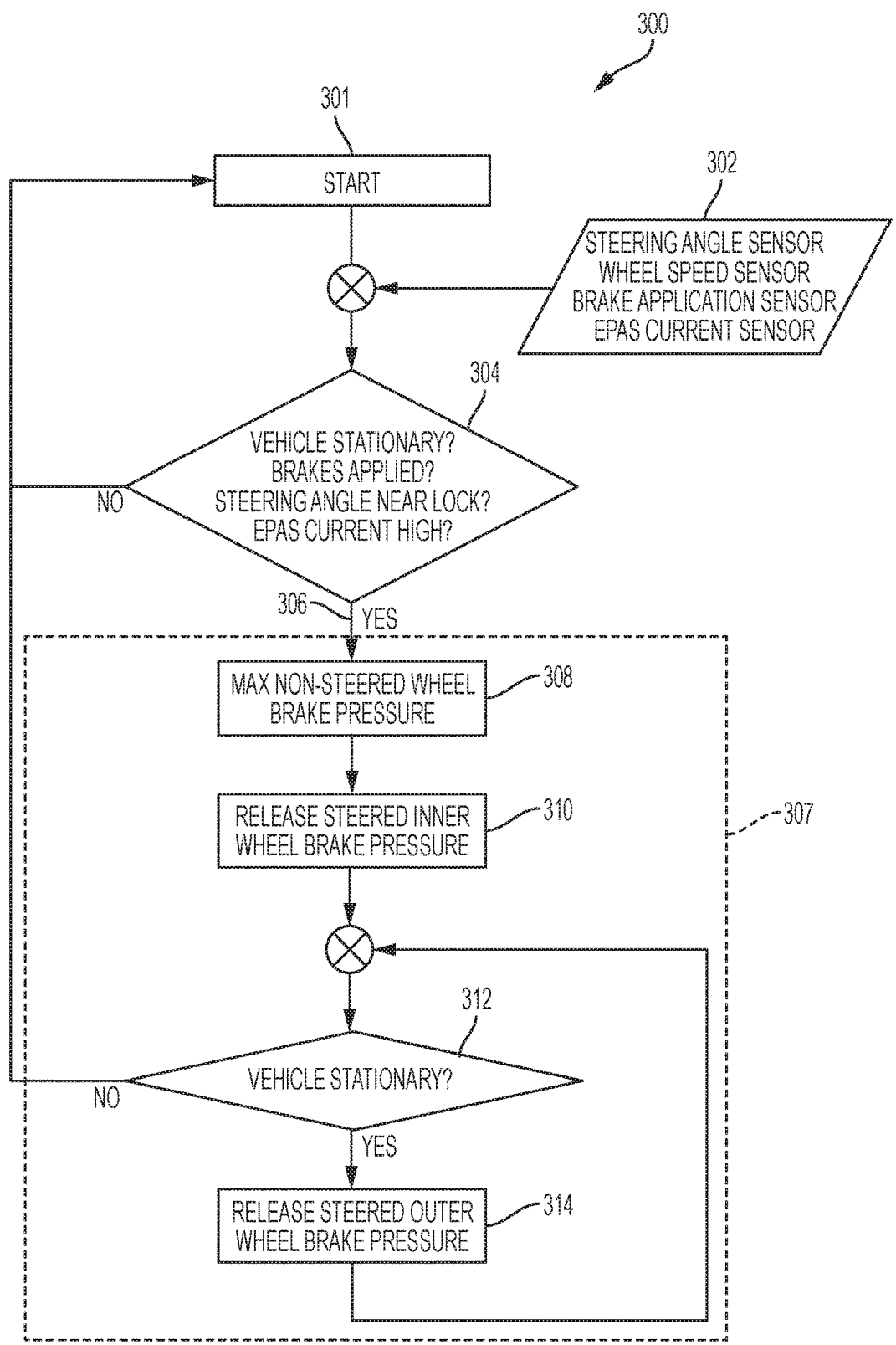
FIG. 3 is a flow chart depicting a method of redistributing brake force in accordance with an exemplary embodiment of the disclosed subject matter.

Referring now to FIG. 3, a flow chart illustrating a method 300 of redistributing braking force is shown. In block 302, data from the various sensors described above is collected. The collected data is transmitted (e.g., through a CAN or LIN messaging protocol through the vehicle bus) to the controller. In block 304, the controller receives the data signals from the various sensors. A brake force redistribution routine 307 may be initiated if one or more signals from the sensors satisfy one or more associated predetermined conditions. For example, in the embodiment of FIG. 3, the controller receives four signals, as described below. If one or more of the signals fails to satisfy the predetermined condition with which it is associated, the brake force redistribution routine may not be initiated. In some embodiments, the controller may receive less than four or more than four signals.

The controller may receive the data from the vehicle speed sensor to confirm that the vehicle 100 (FIG. 1) is stationary. If the vehicle speed sensor indicates the vehicle 100 is in motion (e.g., forward motion, backward motion), the brake force redistribution routine is not initiated, and the method returns to "start" 301. If the vehicle speed sensor indicates the vehicle 100 is stationary, the brake force redistribution routine 307 may be initiated if other required conditions are satisfied.

The controller may receive the signal from the brake application sensor. Such a signal may indicate the state of the brake control (e.g., a depressed or undepressed state of the brake pedal), or may be based on an electronic or other signal to apply the brakes, such as a signal directing application of the brakes in connection with a parking assist system, hill-start assist system, or other automated or semi-automated control routine. If the signal from the brake application sensor indicates a command to apply the brakes is not present, the brake force distribution routine 307 is not initiated and the method returns to "start" 301. In some embodiments, the brake application sensor may be configured to return data related to the level of braking force requested. In some embodiments, the brake force redistribution routine may be started only if a predetermined level of braking force is requested. If a command to apply the brakes is present, and other required conditions are satisfied, the brake force redistribution routine 307 may be initiated, as described below.

The controller may receive a data signal from the steering angle sensor. If the steering angle sensor indicates a steering angle below a certain threshold, the brake force distribution routine 307 is not initiated and the method returns to "start" 301. If the steering angle sensor indicates that the steering angle is above a predetermined threshold, such as that described above in connection with FIG. 2, and the other conditions are satisfied, the brake force redistribution routine may be initiated. The steering angle may be expressed as a percentage of steering "lock," or a percentage of the distance the steered wheels may be turned about their respective steering axes before reaching a maximum steering angle as constrained by the steering linkage components. As described above, the brake force redistribution routine may initiate only when the steering angle enters a range of angles within a specified percentage of the maximum steering angle. Such a range may include, as non-limiting examples, steering angle values equal to or greater than about 25% of the maximum steering angle, equal to or greater than about 50% of the maximum steering angle, equal to or greater than about 75% of the maximum steering angle, or other percentages of maximum steering angle less than, greater than, or between the illustrative percentages provided above.

The controller may receive information from a sensor configured to generate a data signal relating to the force generated by a power assisted steering component. If a force generated by the power assisted steering component is above a predetermined threshold the brake force redistribution routine 307 may be initiated. If the signal is below the predetermined threshold, the brake force redistribution routine 307 may not be initiated, and the method returns to "start" 301. In one embodiment, the controller may receive a signal related to the magnitude of current flow through an electronic power assisted steering (EPAS) component, such as an EPAS motor. In some embodiments, the magnitude of current flow through the EPAS motor may be proportional to the assistance force generated by the EPAS motor. As a non-limiting example, the predetermined threshold for initiating the brake force redistribution routine 307 may be within a range of from about 50% of maximum current flowing through the EPAS motor to about 100% of maximum current flowing through the EPAS motor. In a steering system with a hydraulic assist, the sensor may generate a data signal related to the hydraulic pressure of a steering system, which may be substantially proportional to an assist force produced by the hydraulic steering assist system. Similarly, the predetermined threshold for initiating the brake force redistribution routine 307 may be within a range of from about 50% of maximum hydraulic pressure to about 100% of maximum hydraulic pressure.

Additionally or alternatively, the controller may receive a signal related to steering force. For example, as noted above, one or more steering components may include one or more strain gauges that provide data related to the force applied to the steering system. When the force exceeds a predetermined level and other required conditions are satisfied, the brake force redistribution routine 307 may be initiated.

Moreover, in some embodiments, the criteria for starting the brake force redistribution routine 307 may not include an evaluation of steering assist force or steering force. For example, the controller may receive data related to the vehicle speed, the brake application, and the steering angle, and may initiate or not initiate the brake force redistribution routine 307 based on those parameters without an evaluation of the steering assist force or steering force. In yet other embodiments, the controller may not receive a signal related to the steering angle, and may initiate or not initiate the brake force redistribution routine 307 based on data related to vehicle speed, brake application, and steering assist force and/or steering force.

In the case that any of the above conditions is not satisfied and the method returns to "start" 301, the controller may continuously monitor the data from the signals. In some embodiments, the controller may monitor the signals from the various sensors on a periodic basis. For example, the controller may monitor the signals every 1 millisecond (ms), every 10 ms, every second, etc.

When the signals received by the controller indicate that the required conditions are satisfied, the brake force redistribution routine 307 may be initiated, as indicated at 306. To begin the brake force redistribution routine 307, the controller may send a signal to a brake proportioning value (e.g., an electronically controlled proportioning valve associated with an EBD system of the vehicle 100 (FIG. 1)) to apply maximum braking force (e.g., maximum hydraulic pressure) to brakes associated with non-steered wheels of the vehicle, as indicated at 308. For example, in the embodiment of the vehicle 100 shown in FIG. 1, the controller may send a signal to the brake proportioning valve to apply maximum hydraulic pressure to brakes associated with wheels 103, 104 positioned at the rear axle 106. Additionally or alternatively, the controller may send a signal to actuate an electronically controlled parking brake associated with the wheels of the rear axle 106.

With maximum braking force applied to the rear axle 106, the controller may send a signal to the proportioning valve to release the braking force (e.g., release hydraulic pressure) from one of the wheels associated with the front axle 105 (i.e., one of the steered wheels 101, 102 of the vehicle 100) at 310. The braking force (e.g., hydraulic pressure) may be substantially maintained at the other of the wheels 101, 102 associated with the front axle 105.

The wheel from which the braking force is released may be chosen based at least in part on the reduction in required steering force achieved by releasing the brake. For example, as noted above, when the steering wheel is turned, the inner wheel (i.e., the wheel that would be positioned on the inside of a turning circle traversed by the vehicle 100 if the vehicle 100 were in motion) may be turned more sharply than the outer wheel. Due to the kinematic design of the steering linkage, the steering system may have less mechanical advantage to turn the more sharply turned wheel, and the more sharply turned wheel may contribute more to the required steering force than the outer wheel. Accordingly, the inner wheel may be released to achieve the greatest reduction in steering force obtainable by releasing a single wheel brake.

After braking force is released from the inner front wheel, the controller may again receive the signal from the vehicle speed sensor, as indicated at 312. If the signal from the vehicle speed sensor indicates the vehicle is in motion, the brake force redistribution routine is cancelled and the method returns to "start" at 301.

If the signal from the vehicle speed sensor indicates the vehicle 100 remains stationary after braking force is removed from the inner wheel, the controller may send a signal to the proportioning valve to release the braking force (e.g., hydraulic pressure) from the outer steered wheel, as indicated at 314. The controller again receives the signal from the vehicle speed sensor to determine whether the vehicle 100 is stationary. If the signal from the vehicle speed sensor indicates the vehicle is moving, the brake force redistribution routine is cancelled and the method returns to "start" at 301.

If the signal from the vehicle speed sensor indicates the vehicle is stationary, the braking force from both steered wheels remains released, leaving both steered wheels free to roll as the steering system is operated. Allowing both steered wheels to rotate freely may significantly reduce the friction generated at the contact patches of the tires, and may reduce the force required to be supplied by the steering power assist system, particularly for high steering angles. For example, an EPAS motor with reduced size and power requirements may be used, lessening the cost and weight of the power assist system. Additionally or alternatively, a smaller and/or lower pressure hydraulic assist system may be used, steering effort of a manually operated steering system may be reduced, etc. Moreover, by lessening the maximum force required to steer the vehicle wheels, the steering linkage itself may be required to bear smaller maximum loads, thus potentially enabling an addition reduction in weight and cost.

Figure 4:
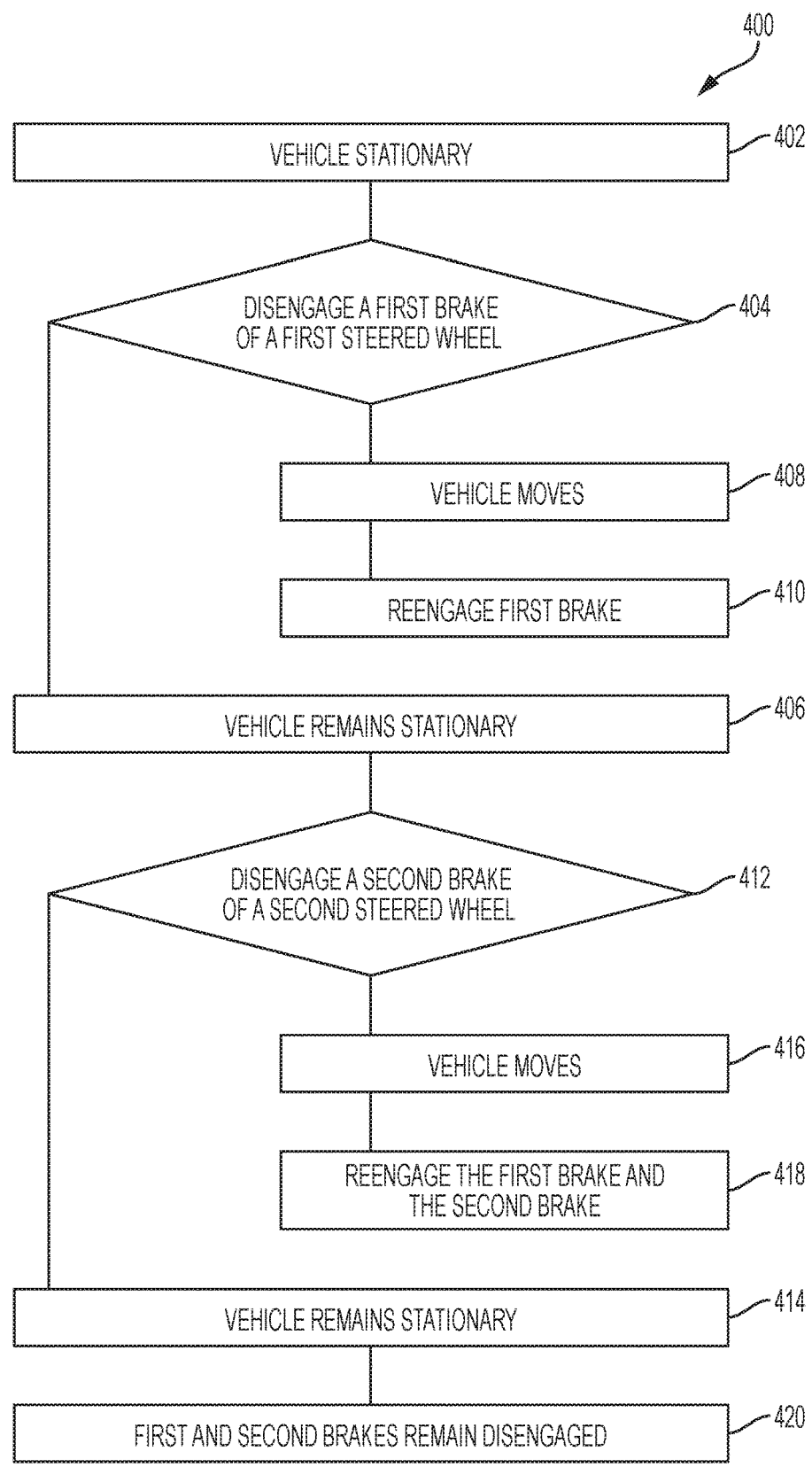
FIG. 4 is a flow chart showing a method of redistributing brake force in accordance with another exemplary embodiment of the disclosed subject matter.

FIG. 4 is a flow chart showing an exemplary method 400 of distributing braking force of a vehicle. In block 402, the vehicle is stationary. In block 404, a first brake of a first steered wheel is disengaged. If the vehicle remains stationary, i.e., if the method 400 proceeds to block 406, the method proceeds to block 412 and a second brake of a second steered wheel is disengaged. If the vehicle remains stationary, i.e., if the method 400 proceeds to block 414, the first and second brakes remain disengaged in block 420.

In the alternative, if the vehicle moves (i.e., the method 400 proceeds to block 408) after the first brake is disengaged in block 404, the first brake is reengaged in block 410. If the vehicle moves (i.e., the method 400 proceeds to block 416) after the second brake is disengaged in block 412, the first and second brakes are reengaged in block 418.

In the description above, reference is made to the electronic control unit (ECU) as a single component. However, this configuration is merely an example and is subject to a variety of implementation-specific variations. For example, in some embodiments, the functions described in reference to the ECU may be performed across multiple ECUs or among multiple components of the ECU. Further, the ECU may include one or more structural components that enable the ECU to function as a controller. The ECU, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system of the controller to operate the logic or portions of the logic presented in the methods disclosed herein. For example, in certain embodiments, the ECU may include computer code disposed on a computer-readable storage medium or a process controller that includes such a computer-readable storage medium. The computer code may include instructions, for example, for initiating the brake force redistribution method based on feedback received from other components of the vehicle, such as from sensors configured to generate data related to vehicle speed, steering angle, brake application, steering assist force, etc.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiments described herein be considered as exemplary only.

What is claimed is:

1. A system, comprising:
   a steering assist system; and
   a controller configured to individually control brake force applied to steered wheels of a vehicle;
   wherein the controller is configured to release a braking force from a first brake associated with a first steered wheel of the vehicle only when the vehicle is stationary and a steering assist force provided by the steering assist system is equal to or above a predetermined steering assist threshold, and
   wherein the controller is further configured to subsequently release a braking force from a second brake of a second steered wheel when the vehicle remains stationary after braking force is released from the first wheel.

2. The system of claim 1, wherein the controller is configured to release braking force from the first brake only when a steering wheel angle of the vehicle is equal to or greater than a predetermined steering wheel angle threshold.

3. The system of claim 2, wherein the predetermined steering wheel angle threshold comprises about 75% of a steering wheel lock angle.

4. The system of claim 1, wherein the controller is configured to release braking force from the first brake only when a command to apply the brakes is present.

5. The system of claim 4, wherein the command to apply the brakes comprises application of a brake pedal of the vehicle.

6. The system of claim 4, wherein the command to apply the brakes comprises a command from an automated brake control.

7. The system of claim 1, wherein the predetermined steering assist force threshold is about 75% of a maximum steering assist force.

8. The system of claim 1, wherein the steering assist force is substantially proportional to a current flow through an electric motor associated with an electric power assist steering system.

9. The system of claim 1, wherein the steering assist force is substantially proportional to a hydraulic pressure of a hydraulic power assist steering system.

10. The system of claim 1, wherein the first wheel and the second wheel comprise wheels positioned at left and right sides of a front axle of a vehicle.

11. The system of claim 1, wherein the controller is configured to apply a maximum braking force to brakes associated with non-steered wheels of the vehicle before releasing the braking force from the brake associated with the first steered wheel of the vehicle.

12. The system of claim 1, wherein the controller is configured to reapply one or both of the first brake and the second brake if the data from the vehicle speed sensor indicates the vehicle is in motion.

13. A method of distributing braking force of a vehicle, comprising:
   with a controller of the vehicle, releasing a first brake of a first steered wheel of the vehicle only when data from a vehicle speed sensor indicates the vehicle is stationary and a steering assist force provided by a steering assist system is equal to or greater than a predetermined threshold; and
   subsequently releasing a second brake of a second steered wheel of the vehicle when data from the vehicle speed sensor continues to indicate the vehicle is stationary after releasing the first brake.

14. The method of claim 13, wherein releasing the first brake associated with the first steered wheel of the vehicle comprises releasing the first steered wheel of the vehicle when a steering wheel angle of the vehicle is equal to or greater than a predetermined steering wheel angle threshold.

15. The method of claim 13, wherein releasing the first brake associated with the first steered wheel of the vehicle comprises releasing a brake associated with a steered wheel on a left side of the vehicle when a steering wheel of the vehicle is turned to the left.

16. The method of claim 13, wherein releasing the first brake associated with the first steered wheel of the vehicle comprises releasing a brake associated with a steered wheel on a right side of the vehicle when a steering wheel of the vehicle is turned to the right.

17. The method of claim 13, wherein releasing the first brake associated with the first steered wheel of the vehicle comprises releasing the first steered wheel of the vehicle when a command to apply the brakes of the vehicle is present.

18. The method of claim 13, further comprising rotating the first steered wheel of the vehicle about a respective first steering axis and rotating the second steered wheel of the vehicle about a respective second steering axis, the first steered wheel being rotated to a greater degree than the second steered wheel.

19. The method of claim 18, further comprising applying a relatively greater steering force to rotate the first steered wheel about the first steering axis and a relatively lesser steering force to rotate the second steered wheel about the second steering axis.

20. A method of distributing braking force of a vehicle, the method comprising:
   determining, at a controller, whether the vehicle is stationary based on data collected by a vehicle speed sensor;
   determining, at the controller, whether a steering wheel angle is above a predetermined threshold based on data collected by a steering wheel angle sensor;
   determining, at the controller, whether brakes of the vehicle are engaged based on data collected from a brake engagement sensor;
   determining, at the controller, whether an assist force of a power steering assist system is above a predetermined threshold;
   releasing a first brake associated with a first steered wheel of the vehicle when the vehicle is stationary, the steering wheel angle is above the predetermined threshold, the brakes of the vehicle are engaged, and the assist force is above the predetermined threshold;
   determining, at the controller, if the vehicle remains stationary after releasing the first brake; and
   upon determination that the vehicle remains stationary, releasing a second brake associated with a second steered wheel of the vehicle.

21. A system, comprising:
a controller configured to individually control brake force applied to steered wheels of a vehicle;
wherein the controller is configured to release a braking force from a first brake associated with a first steered wheel of the vehicle only when the vehicle is stationary and a steering wheel angle of the vehicle is equal to or greater than a predetermined steering wheel angle threshold, the predetermined steering wheel angle threshold comprising at least 25% of a steering wheel lock angle; and
wherein the controller is further configured to subsequently release a braking force from a second brake of a second steered wheel when the vehicle remains stationary after braking force is released from the first wheel.

22. The system of claim 21, wherein the predetermined steering wheel lock angle comprises at least 50% of the steering wheel lock angle.

23. The system of claim 21, wherein the predetermined steering wheel lock angle comprises at least 75% of the steering wheel lock angle.

24. A system, comprising:
a controller configured to individually control brake force applied to steered wheels of a vehicle;
wherein, when the vehicle is stationary, the controller is configured to:
apply a maximum braking force to brakes associated with non-steered wheels of the vehicle before releasing a braking force from a first brake associated with a first steered wheel of the vehicle, and
wherein the controller is further configured to subsequently release a braking force from a second brake of a second steered wheel when the vehicle remains stationary after braking force is released from the first wheel.

* * * * *